United States Patent [19]

Wessling

[11] 4,051,146

[45] Sept. 27, 1977

[54] CONDITIONING OF PERHALOGENO-COPPER PHTHALOCYANINES

[75] Inventor: Diether Wessling, Cologne, Germany

[73] Assignee: Bayer Aktiengesellschaft, Leverkusen, Germany

[21] Appl. No.: 621,801

[22] Filed: Oct. 14, 1975

[30] Foreign Application Priority Data

Oct. 16, 1974 Germany .............................. 2449231

[51] Int. Cl.$^2$ ............................................. C09B 47/04
[52] U.S. Cl. ................................................. 260/314.5
[58] Field of Search ........................................ 260/314.5

[56] References Cited

U.S. PATENT DOCUMENTS 3,017,414  1/1962  Minnich et al. .............. 260/314.5 X

FOREIGN PATENT DOCUMENTS 1,114,462  10/1961  Germany ........................... 260/314.5

Primary Examiner—John D. Randolph
Attorney, Agent, or Firm—Plumley and Tyner

[57] ABSTRACT

Process for conditioning perhalogeno-copper phthalocyanines, characterized in that the melts obtained on halogenation of copper phthalocyanine in the presence of aluminium chloride and other auxiliaries are poured into cold water, an organic solvent is added to the mixture, the whole is heated, without intermediate isolation, for several hours to temperatures between 90° and 150° C, the organic solvent is driven off in steam, the residue is filtered and the material on the filter is washed until free from salt, dried and ground.

2 Claims, No Drawings

CONDITIONING OF PERHALOGENO-COPPER PHTHALOCYANINES

The subject of the invention is a particularly simple process for the preparation of perhalogeno-copper phthalocyanine pigments from the reaction melts which are obtained in the preparation of perhalogeno-copper phthalocyanines by halogenation of copper phthalocyanine in the presence of aluminium chloride and other additives.

By perhalogeno-copper phthalocyanines there are understood the copper phthalocyanines halogenated to close onto the theoretical halogen content of 16 halogen atoms per molecule. The halogen content of the commercially available perhalogeno-copper phthalocyanines is on average between about 13.5 and 15.5 halogen atoms per mol. Suitable halogen atoms are chlorine and bromine, chlorine being particularly preferred.

Perhalogeno-copper phthalocyanines are usually prepared in inorganic melts, for example aluminium chloride/sodium chloride melts or aluminium chloride/sulphuryl chloride melts, by the action of halogens, for example chlorine or bromine. The process according to the invention starts from the halogenation melts.

A process for the conditioning of polychloro-copper phthalocyanine crude pigments is already known from German Auslegeschrift German Published Specification No. 1,114,462 and comprises the following process steps: a melt which is obtained by chlorination of copper phthalocyanine in an aluminium chloride/sodium chloride melt is introduced into cold water. A small amount of o-dichlorobenzene is then poured into the mixture and the whole is stirred for 10 to 15 minutes. The o-dichlorobenzene is completely taken up by the pigment particles so that no oily phase separates out. The paste is then filtered and the filter residue is washed with water until it is free from acid and free from water-soluble inorganic chlorides. The filter residue is then introduced into a large amount of o-dichlorobenzene and stirred to form a smooth paste which is heated to 100°–102° C and kept at this temperature until the water has evaporated. Thereafter, the temperature of the dehydrated paste is raised to 130°–135° C, and maintained for 1.5 hours. The paste is then cooled to below 90° C, sodium hydroxide is added and steam is passed through the mixture until the water vapours which escape no longer contain significant amounts of o-dichlorobenzene. The paste is then filtered and the filter cake is washed until free from alkali, dried and ground.

It has now been found, surprisingly, that perhalogenocopper phthalocyanine pigments of comparable tinctorial strength and brilliance obtained by a substantially simpler process if the halogenation melt is poured into water, an organic solvent is added, the mixture is heated, without intermediate isolation, for 3–8, preferably 4–6, hours to temperatures between 90° and 150° C, preferably 110° to 130° C, the organic solvent is driven off in steam, the aqueous pigment suspension is filtered and washed until free from salt and the filter residue is dried and ground. It was unforeseeable that the presence of the inorganic ions, which inherently are objectionable, does not impair the quality of the pigment conditioned by the treatment with the organic solvent.

Compared to the two-stage process described, the process according to the invention, which takes place without intermediate isolation and hence in one stage, represents a substantial enrichment of the art of conditioning perhalogenocopper phthalocyanine pigments.

Suitable organic solvents are liquid benzene derivatives which can contain halogen atoms, lower alkyl groups or nitro groups as substituents, for example benzene, toluene, xylene, nitrobenzene, monochlorobenzene, dichlorobenzene and trichlorobenzene.

The solvents are employed in amounts of 60–240 percent by weight, preferably 70–100 percent by weight, relative to dry pigment.

EXAMPLE 1

36.0 kg of sulphuryl chloride, 40 kg of anhydrous aluminium chloride and 5 kg of anhydrous sodium chloride are first introduced into a reaction vessel equipped with a reflux condenser.

16.0 kg of copper phthalocyanine are introduced at 50°–60° C and the mixture is heated to 120°–130° C. At about 100° C, the introduction of 25–28 kg of chlorine is started, and is continued at 120°–130° C until the chlorine content of the pigment is about 49%. The melt is poured into 200 kg of water and air is passed through the mixture for 1 hour.

20.0 kg of chlorobenzene are then added and the stirred vessel is closed, heated to 120° C and kept at this temperature for 5 hours. After releasing the excess pressure, and cooling to 95°–100° C, the chlorobenzene is driven off in steam and the product is filtered off hot and washed with hot water until free from salt.

For many pigment preparations, the filter cake which is moist with water can be employed; to prepare a pulverulent pigment, the filter cake is dried at 80°–100° C and ground.

The pigment gives brilliant, deeply coloured bluish-tinged green dyeings when used in an aqueous or non-aqueous system.

EXAMPLE 2

35 kg of sulphuryl chloride, 40 kg of anhydrous aluminium chloride and 15.7 kg of bromine are first introduced into a reaction vessel equipped with a reflux condenser.

At 40°–45° C, 11.0 kg of copper phthalocyanine are introduced and the mixture is heated to 120° C, whilst simultaneously running in a further 9.5 kg of bromine and, if appropriate, replenishing the sulphuryl chloride, and is kept at this temperature for 1 hour.

The melt is poured out onto 220 kg of water and air is passed through the mixture for 1 hour.

27 kg of o-dichlorobenzene are then added and the mixture is heated to 130° C in a closed reaction vessel and kept at this temperature for 6 hours.

The further working up takes place analogously to Example 1. A strongly yellowish-tinged green pigment of high tinctorial strength is obtained, which contains 57–60 percent by weight of bromine and 5–8 percent by weight of chlorine.

EXAMPLE 3

A mixture of 20 kg of anhydrous aluminium chloride, 4 kg of sodium chloride and 1.2 kg of anhydrous copper (II) chloride is fused at 140° C in a reaction vessel.

The introduction of about 15 kg of chlorine is started slowly, 5.0 kg of copper phthalocyanine are introduced at 160° C whilst raising the temperature to 180°–200° C, and the chlorination is carried out at this temperature until the chlorine content is about 49 percent by weight.

The melt is poured into 250 l of water, 7.0 l of nitrobenzene are added and the mixture is heated to 120° C under pressure and kept at this temperature for 6 hours before working up analogously to Example 1.

I claim:

1. Process for conditioning perhalogeno-copper phthalocyanines, characterized in that the melts obtained on halogenation of copper phthalocyanine in the presence of aluminum chloride are poured into cold water, an organic solvent selected from the group consisting of liquid benzene derivatives unsubstituted or substituted by halogen atoms, lower alkyl groups or nitro groups is added to the mixture, the whole is heated without intermediate isolation for 3 to 8 hours to temperatures between 90 and 150° C, the organic solvent is driven off in steam, the residue is filtered and the material on the filter is washed until free from salt, dried and ground.

2. Perhalogeno-copper phthalocyanine pigment conditioned according to the process of claim 1.

* * * * *